ively maintained with the hook portion up-
United States Patent
Cottle

[11] 3,757,451
[45] Sept. 11, 1973

[54] FISH LURE
[76] Inventor: Herbert Cottle, 2902 Sixth Ave. S.W., Huntsville, Ala. 35805
[22] Filed: Sept. 16, 1971
[21] Appl. No.: 181,178

[52] U.S. Cl............. 43/42.1, 43/42.28, 43/42.37, 43/42.4, 43/42.45, 43/43.13
[51] Int. Cl............................................ A01k 85/00
[58] Field of Search............. 43/42.37, 42.4, 42.45, 43/43.13, 42.1

[56] References Cited
UNITED STATES PATENTS
| D203,193 | 12/1965 | Napier | 43/42.37 X |
| 756,009 | 3/1904 | Flegle | 43/43.13 |
| 1,770,904 | 7/1930 | Arbogast | 43/42.16 |
| 3,128,572 | 4/1964 | McVay | 43/42.45 |
| 3,352,051 | 11/1967 | Stewart | 43/42.1 |

Primary Examiner—Louis G. Mancene
Assistant Examiner—Daniel J. Leach
Attorney—C. A. Phillips

[57] ABSTRACT

A fishing lure consisting of a fish hook and a triangular lure body covering the shank of the hook and in which one side of the top surface of the lure body is contoured to sweep upward near the rear of the lure body whereas the opposite side is not so contoured. This assymetry causes the lure to be flipped over if the top side of the lure should become face downward in the water and the lure pulled through the water. This causes the lure to be generally maintained with the hook portion upward and thus less likely to be caught in debris.

8 Claims, 12 Drawing Figures

Herbert M. Cottle INVENTOR.

BY

C.A. Phillips ATTORNEY

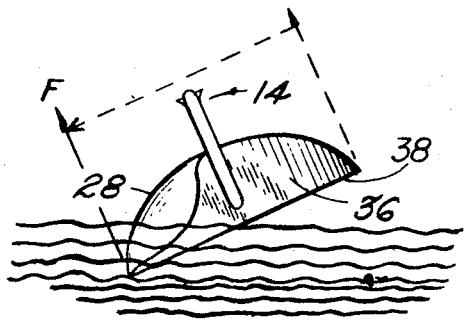
Fig. 6a
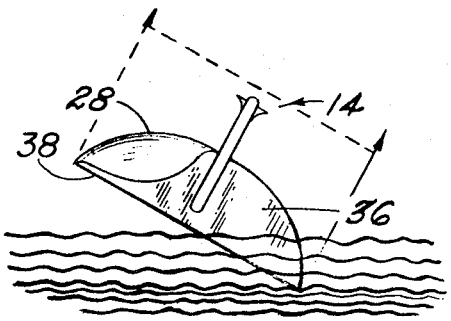
Fig. 6b
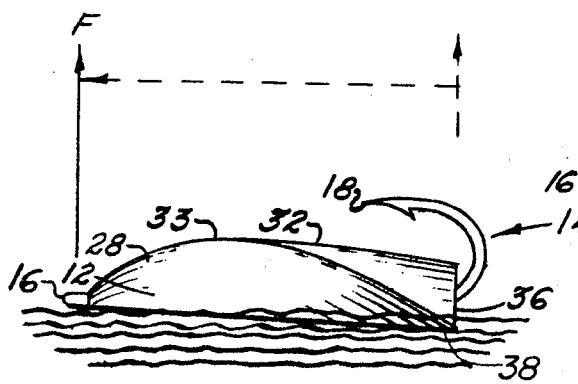
Fig. 7a
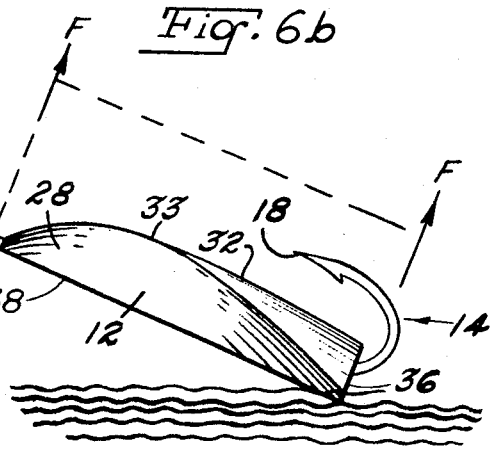
Fig. 7b
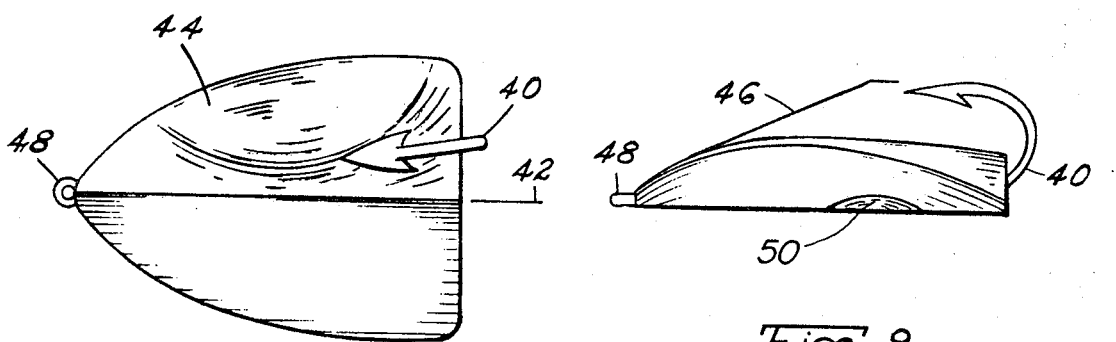
Fig. 8
Fig. 9
Herbert M. Cottle INVENTOR.
BY
C. A. Phillips ATTORNEY

FISH LURE

The present invention relates to fish lures and more particularly to such lures which are particularly adapted to avoid being caught on rocks, floating logs and topwater obstructions in general.

Fishing lures generally have one or more exposed hooks which are free to assume varying orientation and frequently become entangled in weeds, brush, trees, rocks, etc., as they are drawn through the water. Such entanglements frequently result in breakage of the line and loss of a lure. More frequently, however, the hook accumulates weeds, twigs and other debris which inhibit lure action and render it ineffective in its attraction to fish.

In an effort to solve this problem a number of lures have appeared which provide in some fashion wires or other shielding means adjacent to the barbed end of the hook extended to divert extraneous matter therefrom. However, such shielding devices are subject to permanent bending and are thus ineffective at times to prevent angular entry of debris and other matter onto the hook.

It is therefore an object of the present invention to provide a fish lure which reduces the problem of being caught on foreign objects.

Another object of this invention is to provide such a fish lure which has improved attraction for fish, which is economically manufactured, is of durable construction, and is convenient to use.

In accordance with the invention a lure body having a pointed or reduced area frontal portion is combined with a fish hook wherein the eye of the hook corresponds to the central frontal point of the lure body and the hooked portion of the fish hook extends outward and makes a 180° bend from the rear of the lure body with the barbed end of the hook being pointed in a direction generally parallel to the longitudinal axis of the lure body, and opposite and exposed to what will be termed the top side of the lure body. This designation of "top side" is valid as means are provided to maintain one side upward in the water. Thus on one half side of this "top side," with reference to the longitudinal or front-to-back axis of the lure body, the surface is contoured to curve outward near the rear of the lure to produce a lifting effect not present on the other half side of the "top side" of the lure body and this construction causes the lure, when pulled through the water, to be flipped over if the "top side" should, for some reason, be turned down in the water. As a further feature of the invention the assymetry which produces this "righting" action may comprise increased mass on one side of the lure and thus create sufficient imbalance in the lure to cause it to rock or roll gently from side to side when the lure is pulled through the water and when resting on the proper or "back side" of the lure. In this way "attention" is directed to the lure.

Other objects, features and advantages of the present invention will become more apparent from the following description when considered in conjunction with the drawings in which:

FIGS. 6a and 6b are rear views of the lure of FIG. 1 illustrating a characteristic of rolling motion of the lure;

FIGS. 7a and 7b are side views of the lure of FIG. 1 illustrating a pitching characteristic of the lure;

FIG. 8 is a top plan view of an alternate embodiment of the invention;

FIG. 9 is a side view of the lure shown in FIG. 8;

Figure 1:
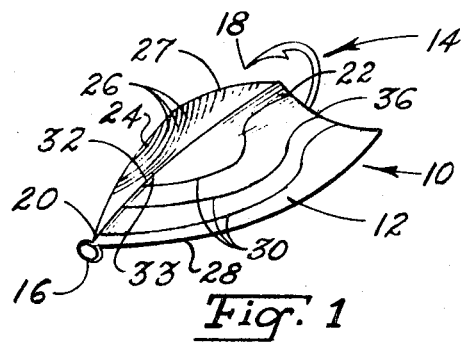
FIG. 1 is a perspective view of the top side of a fish lure embodying the principles of the present invention.
Figure 2:
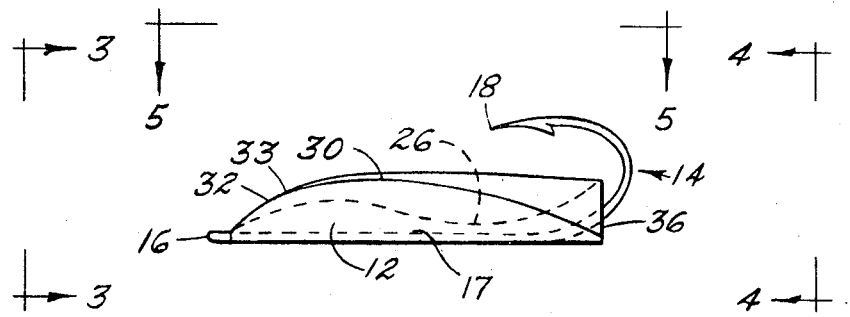
FIG. 2 is a side view of the lure of FIG. 1.
Figure 3:
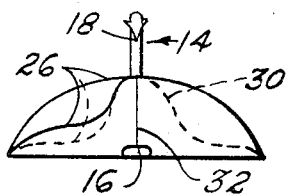
FIG. 3 is a front view of the lure of FIG. 1.
Figure 4:
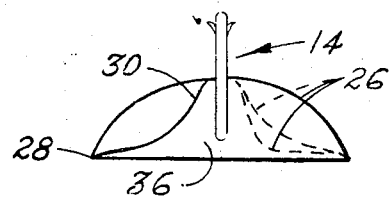
FIG. 4 is a rear view of the lure of FIG. 1.
Figure 5:
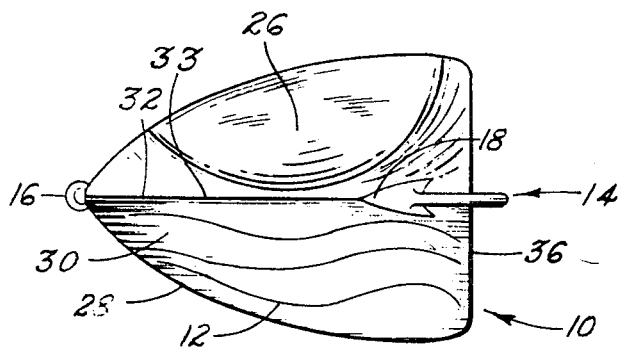
FIG. 5 is a top plan view of the lure of FIG. 1.

Referring now to the drawings, fishing lure 10 generally consists of lure body 12 and fish hook 14. Lure body 12 is constructed of relatively light material such as wood or a suitable plastic composition. In profile, as seen from the top or bottom, it is generally triangular in shape, with a pointed front corresponding to the position of eye 16 of fish hook 14. The lure body widens with distance from the front although the maximum width may be at a point intermediate between the front and rear of the lure. As shown, lure body 12 is bonded or otherwise attached about the shank 17 of fish hook 14 with the curved portion of the fish hook extending from the rear of the lure and around so that the barbed portion or end 18 of fish hook 14 points toward the front end 20 of the lure and is exposed to the top side 22 of lure body 12.

Considering shank 17 of fish hook 14 to be positioned along the longitudinal axis of the lure, the contour of the top side of lure body 12 is such that each side of this axis differs in that side 24 includes a concave region 26 and the other half side 28 is characterized by a somewhat convex region 30. The lure is essentially symmetrical from front point 20 back to point 32. From point 32 along line 33 rearward, side 24 is curved upward then downward and then upward, or outward. In contrast, along line 33, side 28 of the lure generally curves upward then downward to the rear edge 36 of the lure.

To consider the significance of this construction, assume that the lure has been cast out and it falls "top side" down in the water. As the lure is reeled in, the two differently contoured "top" surfaces, now downward, provide different paths for water flow from the front of the lure to the rear of the lure. With respect to side 24, water flow is caused to be abruptly forced away from the lure. This occurs near the rear of the lure where the lure is the broadest and where maximum effect is produced by the outsweeping contour. Thus with an opposite contour on the other half side of the top side of the lure, water is not caused to be forced outward from the lure and there arises a reaction force between side 24 and the water producing a substantial torque which causes the lure to be abruptly rotated about its longitudinal axis and be flipped over so that the top side of the lure and hook are positioned upward and thus protected with respect to obstructions over which the lure is pulled. This feature is particularly advantageous in preventing entanglement with surface weeds. In addition to the ability of the lure to avoid entanglement, the construction of the lure is particularly effective in attracting fish. It exhibits two distinctive movements which appear to account for this. First, by virtue of the difference in mass distribution between sides 24 and sides 28 of lure body 12 produced by the assymetry in construction discussed above, there is produced a tendency for the lure to roll or rock about the longitudinal axis of the lure as shown in FIGS. 6a and 6b, which illustrate a condition where the lure is being pulled in a righted condition with its essentially flat side down. As shown, lure 10 forces F are transferred from side to side enabling and maintaining the rolling or rocking movement.

Second, with the bottom surface 38 either planar, or symmetrically contoured, that is, with both half sides of the bottom surface presenting the same general flow path, the lure tends to plane with the front portion rising first. Then, as shown in FIGS. 7a and 7b the lift force F is transferred to the rear of the lure and the rear portion of the lure is raised causing the lure to return to its original near level position shown in FIG. 7a. After this, the nose is again raised by the force F which builds up against the forward portion on the bottom of the lure and the process repeats with resulting pitching movement of the lure.

Thus, as a result of the side-to-side imbalance the lure goes through both side-to-side rocking movement and fore and aft pitching movement with the result that the lure presents a combination of movements which have proven extremely effective in attracting fish.

FIGS. 8 and 9 illustrate an alternate embodiment of the invention wherein fish hook 40 is offset by a small angle with respect to the center line or axis 42 of lure body 44. This increases the mass imbalance from side to side of the lure to enhance the side-to-side rolling or rocking motion of the lure. There is also provided a resilient wire 46 (shown in FIG. 9) extending from near eye 48 of fish hook 40. This feature functions to prevent entanglement of the lure when it is not being pulled through the water, as for example when cast through or by an obstruction such as the branches of a tree wherein wire 46 prevents fish hook 48 from being caught on the tree. After the lure is in the water, of course, the reaction of the lure with the water will cause it to be positioned with the fish hook point up which generally prevents entanglement with logs, rocks, debris and weeds. The feature of the resilient wire may also be used, of course, with the embodiment of the invention shown in FIG. 1.

FIG. 9 illustrates still another means of enhancing or obtaining a side-to-side unbalance and a rocking motion of the lure by virtue of indentation 50 which provides a difference in contours of the bottom sides of the lure on each side of the longitudinal axis of the lure. The resulting differences in water pressure as the lure is pulled through the water produces the rocking motion.

Figure 10:
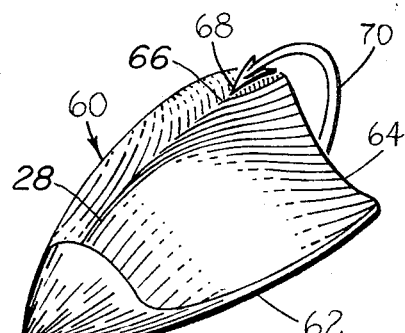
FIG. 10 is a perspective view of still another embodiment of the invention.

FIG. 10 illustrates a form of the invention wherein the body of lure 60 is of two piece construction. The lower portion 62 of it is of a fairly rigid material such as a hard plastic material, whereas upper portion 64 is of a soft material such as foam rubber, or plastic foam, or is constructed of a hollow flexible material to otherwise cause the lure to float when stationary. Upper portion 64 is contoured to the same top surface contour as the lure shown in FIG. 1 but differs in that top surface 66 extends up to hook 68 of fish hook 70. Thus upper portion 64 of lure 60 performs two roles. One, it is of a construction which enables the lure to float, and two, it serves as a weed guard.

Other forms of unbalanced top contour may be employed, such as the inclusion of a spoiler plate extending from the rear of the lure upward to achieve the "righting" action. Further, the mass imbalance between sides of the lure may be created or enhanced by differences in density of the sides, or by the application of a weight or weights to one side of the lure.

While not shown in any of the embodiments of the invention it is anticipated that a lure would further include, in some instances, two or more flexible trailing members such as provided by a rubber or plastic material. The trailing members would be on the order of the length of the lure body and would appear as streamers trailing behind the lure as it is pulled through the water.

What is claimed is:

1. A fish lure comprising:
   A. a fish hook member comprising:
      1. a generally straight shank portion,
      2. an eye on a forward end of said shank portion, and
      3. a curved portion having a pointed end, said curved portion extending from the rear end of said shank portion;
   B. an elongated lure body having a distinct top side, a distinct bottom side and wherein said shank portion of said fish hook member is affixed to and extends longitudinally along the length of said body, with the barbed portion of said fish hook member exposed on the top side of said lure body, and:
      1. the width of said elongated lure body is generally triangular with a pointed fore portion located generally at the position of said eye of said fish hook, and
      2. a front to back surface on one half side of said top side of said lure body includes a surface portion contoured to vary directly in depth from the top side of the lure body to a greater degree, with distance from the front of the lure rearward, than exhibited by the surface of the other half side of said top side of said lure body, whereby the resulting assymmetrically contoured top side causes the lure to flip over if it is pulled through water with the top side down.

2. A fish lure as set forth in claim 1 wherein said curvature of said first named half side of said lure body is concave.

3. A fish lure as set forth in claim 1 wherein the mass of said lure body on one side of the plane of said fish hook member differs from the mass on the other side of the plane of said fish hook, whereby, when pulled through the water, said lure is caused to rock about the longitudinal axis of said lure as a result of the radial imbalance of mass.

4. A fish lure as set forth in claim 1 wherein the contours of the bottom surface differ on each side of the longitudinal axis of said lure, whereby, when pulled through the water said lure is caused to rock about the longitudinal axis of said lure as a result of the uneven water pressures resulting from said differences in contour.

5. A fish lure as set forth in claim 1 wherein the shank of said fish hook member is positioned at an angle to the longitudinal axis of said lure body creating a mass imbalance, whereby, when pulled through the water, said lure is caused to rock about the longitudinal axis of said lure as a result of the radial imbalance of mass.

6. A fish lure as set forth in claim 5 further comprising a resilient wire extending from the fore portion of said lure body to a point adjacent the pointed end of said hooked portion of said fish hook member whereby an additional safeguard is provided against the fish hook being snagged on objects with which the lure comes in contact as it is retrieved.

7. A fish lure as set forth in claim 1 wherein a top portion of said lure body is flexible and extends upward to a position adjacent the pointed end of said hook, whereby the said top portion of a lure serves as a weed guard for the fish hook.

8. A fish lure as set forth in claim 7 wherein said top portion of said lure is constructed of a buoyant material whereby said lure is caused to float.

* * * * *